(12) United States Patent
Wang et al.

(10) Patent No.: US 12,279,017 B1
(45) Date of Patent: Apr. 15, 2025

(54) ENHANCED SHOPPING BASED ON RECOGNITION OF OBJECTS PRESENTED IN VIDEO

(71) Applicant: Amazon Technologies, Inc., Seattle, WA (US)

(72) Inventors: Lingyun Wang, Bothell, WA (US); Qipin Chen, Bellevue, WA (US); Xing Ju, Bellevue, WA (US); Gordon Snow Zhang, Seattle, WA (US); Jack Patrick Copeland, Clyde Hill, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/841,418

(22) Filed: Jun. 15, 2022

(51) Int. Cl.
*H04N 21/478* (2011.01)
*G06Q 30/0601* (2023.01)
*G06V 20/40* (2022.01)

(52) U.S. Cl.
CPC ... *H04N 21/47815* (2013.01); *G06Q 30/0623* (2013.01); *G06V 20/40* (2022.01)

(58) Field of Classification Search
CPC ............. H04N 21/47815; G06V 20/40; G06Q 30/0623
See application file for complete search history.

(56) References Cited

U.S. PATENT DOCUMENTS

| 8,682,739 | B1 | 3/2014 | Feinstein |
| 9,973,819 | B1 | 5/2018 | Taylor et al. |
| 10,055,783 | B1 | 8/2018 | Feinstein |
| 10,440,435 | B1 | 10/2019 | Erdmann et al. |
| 10,440,436 | B1 | 10/2019 | Taylor et al. |
| 2014/0259056 | A1* | 9/2014 | Grusd ................ H04N 21/4725 725/34 |
| 2014/0282677 | A1* | 9/2014 | Mantell ............... H04N 21/435 725/23 |
| 2015/0100989 | A1* | 4/2015 | Gellman ........... H04N 21/4725 725/60 |
| 2022/0182725 | A1* | 6/2022 | Song ................. G06Q 30/0623 |
| 2022/0309553 | A1* | 9/2022 | Gibbon ............. G06Q 30/0643 |
| 2023/0065762 | A1* | 3/2023 | Gupta .................... G06V 20/41 |
| 2023/0283839 | A1* | 9/2023 | Vella ................ H04N 21/23418 725/19 |

* cited by examiner

*Primary Examiner* — Jefferey F Harold
*Assistant Examiner* — Franklin S Andramuno
(74) *Attorney, Agent, or Firm* — Eversheds Sutherland (US) LLP (57) ABSTRACT

Devices, systems, and methods are provided for smart shopping based on recognition of objects presented in video. A method may include identifying, by a first device, using a machine learning model using a computer vision technique, objects represented in video content; determining that an object of the objects is available for purchase using an online retail system; causing concurrent presentation of the video content and a first indication that the object is available for purchase using the online retail system; receiving, from a second device, a second indication of a user selection of the first indication, wherein the user selection is indicative of a request to present additional information associated with the object; generating, based on the request, presentation data including the additional information and an option to purchase the object using the online retail system; and causing, based on the request, presentation of the presentation data.

20 Claims, 6 Drawing Sheets

ENHANCED SHOPPING BASED ON RECOGNITION OF OBJECTS PRESENTED IN VIDEO

BACKGROUND

Content is increasingly becoming more interactive, allowing users to select options when presented with content. People may watch video content and see items of interest, but may not be presented with ways to purchase those items. Devices may not be able to determine which items on screen may be of interest to a user, and may lack the ability to present purchase options for items presented in video content.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for smart shopping based on recognition of objects presented in video.

When people watch video content, such as a livestream or video on demand (VOD), they may want to purchase items that they see in the video content. For example, a viewer may want to purchase clothes worn by actors portrayed in the video content and items used by or shown by the video content.

Some computer-based shopping systems allow users to search for products to purchase, select the products, and purchase them. Some computer systems stream video content to users. However, some existing computer systems lack the ability to identify objects shown in video content, or similar objects, that may be purchased by a viewer of the video content by using a computer-based shopping system.

In one or more embodiments, a user device may execute an application that presents video content to a user (e.g., livestream video, VOD, etc.). The video content may be presented with one or more points of interest (POIs) in the video content, the POIs representing products shown in the video content and available for the user to purchase using an online shopping system. For example, a video frame may present video data that represents the video content along with indications of POIs for objects shown in the video frame and that may be purchased by the user. When the user selects a POI indication in a displayed video frame (e.g., text or image indicating that selection of the POI indication will result in purchase information of the corresponding object being presented to the user), the user may be presented (e.g., on the same or another device) with a link to a product page where the user may purchase the product.

In one or more embodiments, the POIs may be identified using image analysis of the video frames of video content. In this manner, rather than an advertiser providing the POI indications for products represented by the video content, computer vision techniques may analyze video frames for which the products have not been previously identified. The computer vision techniques may identify objects represented by the video data of a video frame. A computer system may search an online shopping system for the same object, or a similar object, available for purchase via the online shopping system. For example, the computer system may use text (e.g., describing the product identified in the video data) as a search input to the online shopping system, and may compare the identified image of a product in the video data to images of products available for purchase via the online shopping system (e.g., multi-modal searching). When the computer system identifies matching images between the video data and the product images of available products in the online shopping system, the computer system may determine that the products match, and that the matching product in the online shopping system may be indicated as a POI for the video data. When no matching product exists in the online shopping system, the computer system may identify a similar product, such as a product having a same description (e.g., white shirt, brown shoes, etc.) even if there is no matching image in the online shopping system. In this manner, the computer system may pre-identify products in video and available for purchase via the online shopping system prior to presenting the video to a user and without being provided links, tags, or other indications of the objects shown in the video.

In one or more embodiments, multi-modality may include the text and image searching to match the objects identified in video content to corresponding products in a product catalog, and may include a combination of video, audio, and text for the video content and POIs presented. In particular, a user may watch the video content, read text, and/or listen to audio content. User interactions with the different modalities may be considered by a recommendation service to generate rankings of video to present to users. For example, when a user selects a presented POI, image and text data may be extracted from the presented video content and POI, and input to a machine learning model used to identify related videos and/or POIs that a user is likely to view and/or select.

In one or more embodiments, when POIs have been identified based on products in the video data having the same or similar purchasable products in the online shopping system, the computer system may determine which POIs to present with the video data to a user. For example, a given video frame may show many objects, and it may be undesirable to a user to have a video frame dominated by presentations of objects for purchase. The computer system may rank a given video frame's POIs and select a top X number of POIs (e.g., limit the POIs of a video frame to a threshold number of POIs). The ranking may be personalized to a given user (e.g., based on purchase history, user demographics, and the like, in accordance with relevant laws and with user consent). The computer system may send to the user device video application the video data for presentation along with the POI data and metadata, allowing the video application to present the video frames and the respective POI indications that indicate to viewers which objects in a video frame are available for purchase when selected by the user.

In one or more embodiments, when a user selects a POI presented with the video data (e.g., via a touch, click, voice input, etc.), the computer system may determine which POI was selected (e.g., based on a time/corresponding video frame and location of the selection within the video frame). When the computer system identifies which POI was selected, the computer system may determine which object available for purchase via the online shopping system corresponds to the POI, and may invoke a messaging service to generate and send a message to the user (e.g., to a registered device of the user) that may include details for the product and a link to a product page in the online shopping system where the user may purchase the product. A notification service may receive notification requests for the POI product information, the requests including a user identifier for a viewer of the application, a channel type, and a POI identifier. The notification service may trigger a serverless computing function to process and respond to the requests. The serverless computing function may read the POI assets in an asset registry (as described below) to identify the requested POI asset details, allowing the serverless computing function to generate a message body with the POI asset details. The serverless computing function may invoke a notification platform to send the notification to a device associated with the user identifier.

In one or more embodiments, when a user event related to a POI occurs at the user device application (e.g., a viewing or selection of a displayed POI for more information), the computer system may store the user event. Stored user events related to POI views and selections may be used by the computer system to generate metrics (e.g., engagement metrics). Whether or not a user selected a presented POI, as indicated by the metrics, may be considered when selecting which POIs for a video frame to present to a viewer.

In one or more embodiments, in response to the user device application's request for recommended videos (e.g., an application programming interface call requesting recommended videos), the computer system may return recommended videos for a user, along with the POIs for the recommended videos. The POIs may be returned in a same application programming interface (API) response as or a different API response than the API response that returns the recommended videos. When the POIs are identified, they may be stored in an asset registry. In this manner, when the recommended videos are returned in response to an API call for recommended videos for a user, the computer system may retrieve the POI assets and their information from the asset registry to return to the requesting application. The service that performs POI detection in the video data may open an endpoint to allowing incoming calls from the asset registry. For example, the asset registry may request a video uniform resource locator (URL), and the endpoint of the POI detection service may return the POIs detected for the video corresponding to the video URL. Summaries of the POIs may be published to a ranking service that performs the video/POI rankings, and the POI summaries may be included in response to received requests to get recommended videos (e.g., an API call).

In one or more embodiments, the machine learning model used for POI object detection may support shopping-related detection, such as products and styles. The machine learning model may output a summary of the detected objects in videos, such as identified actors, their styles, products, and the like. The machine learning model may output the coordinates (e.g., video frame coordinates) of the detected POIs, allowing for subsequent detection of which POIs are selected by a user based on where a user selection of a POI occurs within a video frame. The same POI may occur in multiple frames at different locations, so the machine learning model may need to recognize such POIs as a single POI having multiple locations and times within a video. The machine learning model may be able to limit the number of POIs presented in a given video frame and in a video clip.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
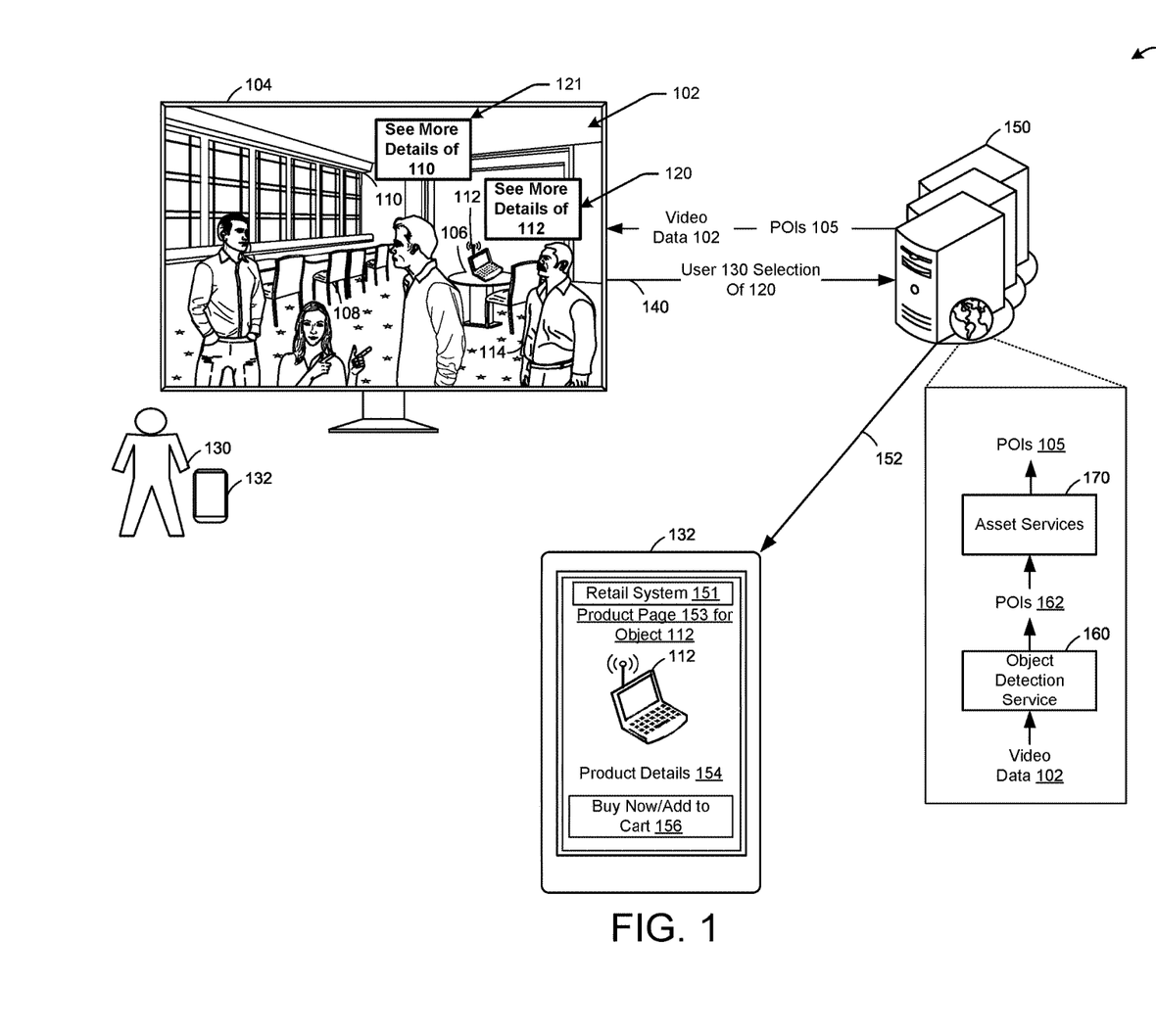
FIG. 1 illustrates an example process for shopping based on recognition of objects presented in video, in accordance with one or more example embodiments of the present disclosure.

FIG. 1 illustrates an example process 100 for shopping based on recognition of objects presented in video, in accordance with one or more example embodiments of the present disclosure.

Referring to FIG. 1, the process 100 may include video data 102 (e.g., video content, such as one or more video frames of one or more video titles) displayed by a device 104. The video data 102 may represent, in any given video frame, people and objects. Some of the objects may be available for purchase using an online retail system, and therefore may be represented as points of interest (POIs 105) within respective video frames. As shown, object 106 (e.g., a table), object 108 (e.g., a chair), object 110 (e.g., a shelf), object 112 (e.g., a device), and object 114 (e.g., a shirt) may be POIs indicated within the video frame of the video data 102 as available for purchase. For example, the object 112 may be presented with a POI indication 120 that the object 112 is available for purchase (e.g., an indication of "See more details," "Send me more information." "Learn more." "Purchase this item here," and the like), and the object 110 may be presented with a POI indication 121 that the object 110 is available for purchase. In this manner, multiple objects (e.g., POIs) may be presented within a given video frame as available for purchase (or at least an option to learn more about the object as a retail product). The purchase of an object represented by a POI may be facilitated outside of the video data 102 (e.g., using a different application than the application used to present the video data 102).

Still referring to FIG. 1, when a user 130, having a device 132, makes a user selection 140 of a POI (e.g., a selection of the POI indication 120 corresponding to the object 112), the device 104 may send an indication of the user selection 140 to a remote device 150 (e.g., one or more cloud-based devices). The user selection 140 may be a touch of the device 104, a gesture, a verbal utterance indicating a user selection, a click of the POI indication 120 (e.g., via a remote control device), or the like. In response to receiving the user selection 140, the remote device 150 may generate presentation data 152, such as a message (e.g., email, text, etc.) or product page including product information for the object 112, or a link (e.g., uniform resource locator) to a product page including product information for the object 112. For example, the presentation data 152 may include user interface data for an online retail system 151, including a product page 153 for the object 112, which may indicate product details 154 (e.g., price, availability, fulfillment options, customer reviews, seller, brand, and the like), and which may include an option 156 to purchase or add the object 112 to a virtual shopping cart from which the user 130 may purchase one or more items.

In one or more embodiments, to facilitate presentation of the video data 102 at the device 104, the remote device 150 may generate the POIs 105 to be presented with any given video frame of the video data 102. Using machine learning, the remote device 150 may input the video data 102 into an object detection service 160, which may (e.g., using computer vision techniques comparing images of the video data 102 to images of objects) identify objects represented in the video data 102. The identified objects may be represented as POIs 162, and may be input to one or more asset services 170 to identify which of the POIs 162 correspond to products available for purchase in the online retail system 151 (e.g., by comparing image and/or text data of the POIs to a product catalog of available products in the online retail system 151), and by limiting the POIs to display in a single video frame to a maximum number of POIs, which may be selected based on rankings and user preferences. The selected POIs 105 may be provided, along with the video data 102, to the device 104 for presentation. In this manner, the identification of objects presented in the video data 102 and available for purchase in the online retail system 151 may be detected by the remote device 150 using object recognition in the video data 102 rather than the video data 102 being encoded with embedded links, advertisements, or tags provided to the remote device 150 by a retailer.

In one or more embodiments, the computer vision techniques used by the object detection service 160 may identify objects represented by the video data 102 of a video frame. The remote device 150 may search the online retail system 151 for the same object, or a similar object, available for purchase via the online retail system 151. For example, the remote device 150 may use text (e.g., describing the product identified in the video data 102) as a search input to the online retail system 151, and may compare the identified image of a product in the video data 102 to images of products available for purchase via the online retail system 151. When the remote device 150 identifies matching images between the video data 102 and the product images of available products in the online retail system 151, the remote device 150 may determine that the products match, and that the matching product in the online retail system 151 may be indicated as a POI for the video data 102. When no matching product exists in the online retail system 151, the remote device 150 may identify a similar product, such as a product having a same description (e.g., white shirt, brown shoes, etc.) even if there is no matching image in the online retail system 151. In this manner, the remote device 150 may pre-identify products in video and available for purchase via the online retail system 151 prior to presenting the video data 102 to the user 130 and without being provided links, tags, or other indications of the objects shown in the video data 102.

In one or more embodiments, when the POIs 162 have been identified based on products in the video data 102 having the same or similar purchasable products in the online retail system 151, the remote device 150 may determine the POIs 105 to present with the video data 102 to the user 130. For example, a given video frame may show many objects, and it may be undesirable to the user 130 to have a video frame dominated by presentations of objects for purchase. The remote device 150 may rank a given video frame's POIs and select a top X number of POIs (e.g., limit the POIs of a video frame to a threshold number of POIs). The ranking may be personalized to a given user (e.g., based on purchase history, user demographics, and the like, in accordance with relevant laws and with user consent). The remote device 150 may send to the device 104 the video data 102 for presentation along with the POI data and metadata, allowing a video application of the device 104 to present the video frames and the respective POI indications that indicate to viewers which objects in a video frame are available for purchase when selected by the user 130.

In one or more embodiments, when the user 130 selects a POI presented with the video data 102 (e.g., via a touch, click, voice input, etc.), the remote device 150 may determine which POI was selected (e.g., based on a time/corresponding video frame and location of the selection within the video frame). When the remote device 150 identifies which POI was selected, the remote device 150 may determine which object available for purchase via the online retail system 151 corresponds to the POI, and may invoke a messaging service to generate and send the presentation data 152 to the user (e.g., to the device 132) that may include details for the product and a link to the product page 153 in the online retail system 151 where the user 130 may purchase the product.

In one or more embodiments, the device 104 and/or the remote device 150 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
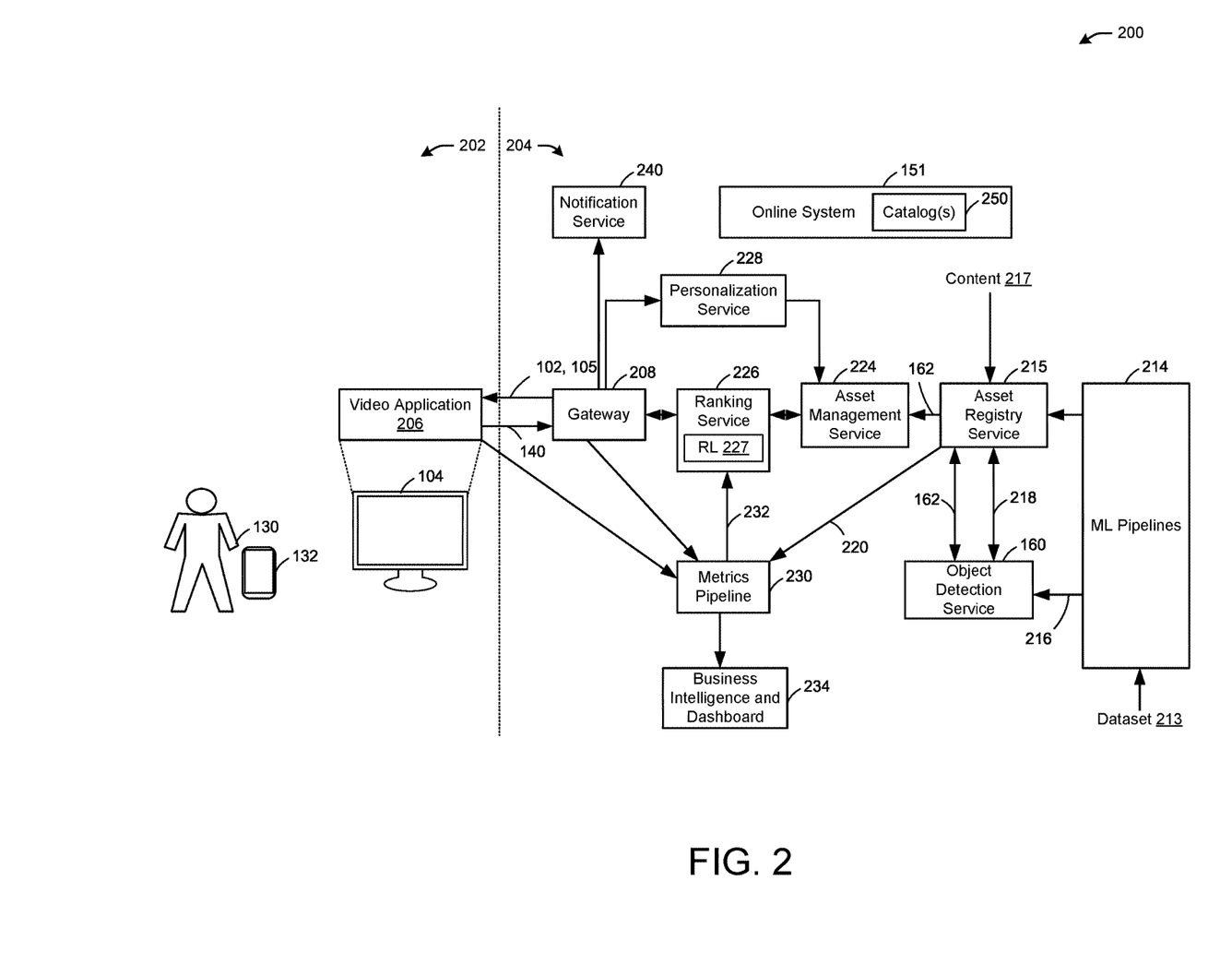
FIG. 2 illustrates an example system for shopping based on recognition of objects presented in video, in accordance with one or more example embodiments of the present disclosure.

FIG. 2 illustrates an example system 200 for shopping based on recognition of objects presented in video, in accordance with one or more example embodiments of the present disclosure.

Referring to FIG. 2, the system 200 may include a front-end 202 (e.g., client side) and a back-end 204 (e.g., server side) of a video application 206 executable by the device 104 of FIG. 1. The video application 206 may receive the video data 102 and the POIs 105 of FIG. 1 from the back-end 204 (e.g., via a gateway 208). To generate the POIs 105, the back-end 204 may input a dataset 213 into one or more machine learning (ML) pipelines 214 (e.g., an object detection pipeline 214 configured to generate, based on the dataset 213, and provide an object detection model 216 to the object detection service 160 of FIG. 1, a ranking ML pipeline to rank video titles/clips, and a sourcing ML pipeline to generate candidate lists for POI assets to be sent to an asset registry service 215). In this manner, the one or more ML pipelines 214 may provide the object detection model 216 to the object detection service 160, and may provide the candidate assets to the asset registry service 215 for consideration. The candidate assets may be based on data inputs provided by multiple video sources. The asset registry service 215 may receive content 217 (e.g., video content), and may provide to the object detection service 160 URLs 218 (e.g., uniform resource locators) for the content 217. Using the URLs 218 to the content 217 and the object detection model 216, the object detection service 160 may detect objects in the content 217 as the POIs 162 of FIG. 1, and may provide the POIs 162 and their metadata (e.g., which video title/clip, which video frame, the coordinate location of the POIs within a video frame, etc.) to the asset registry service 215.

Still referring to FIG. 2, the asset registry service 215 may provide metadata 220 for the content 217 (e.g., video titles, frames, etc.) to a metrics pipeline 230, and may publish the POIs 162 to an asset management service 224. The asset management service 224 may receive calls from a ranking service 226, having a reinforcement learning (RL) model 227, and from a personalization service 228 to return POI asset information. When the gateway 208 receives the user selection 140 of FIG. 1 from the video application 206, the gateway 208 may provide an indication of the user selection 140 to a metrics pipeline 230. The metrics pipeline 230 may generate metrics indicating which POIs were selected, their video titles, locations, corresponding products, etc., and may send real-time feedback 232 to the ranking service 226 to allow the ranking service 226 to generate and update rankings of the content 210 (e.g., rankings of video titles/clips based on which titles/clips are more likely to be viewed and used to select POIs). The ranking service 226 may use the real-time feedback 232 to rank the video content 210 and corresponding POIs. In this manner, the POIs 105 selected and returned for presentation with the video data 102 may be selected based on the rankings and/or a maximum number of POIs allowed to be presented in a given video frame.

Still referring to FIG. 2, the gateway 208 may provide, to the personalization service 228, videos that the user 130 has saved for later. The metrics pipeline 230 may provide metrics to a business intelligence and dashboard 234 to attribute any purchases of products represented by POIs to the video content from which the POI was generated. Based on the user selection 140, the gateway 208 may notify a notification service 240. Because the pages for the identified objects have been generated, the notification service 240 may generate one or more messages, such as with links to the product pages for objects corresponding to POIs, to be sent to the device 132.

In one or more embodiments, the device 104 may execute the video application 206 that presents the video data 102 to a user (e.g., livestream video, VOD, etc.). The video data 102 may be presented with one or more points of interest (POIs) in the video data 102, as shown in FIG. 1, the POIs representing products shown in the video data 102 and available for the user 130 to purchase using the online retail system 151. When the user 130 selects a POI indication in a displayed video frame, the user 130 may be presented (e.g., on the same or another device) with a link to a product page where the user may purchase the product.

In one or more embodiments, the POIs may be identified using image analysis of the video frames of the video data 102. In this manner, rather than an advertiser providing the POI indications for products represented by the video data 102, the object detection service may apply computer vision techniques to analyze video frames for which the products have not been previously identified. The computer vision techniques may identify objects represented by the video data 102 of a video frame. The asset registry service 215 may search the online retail system 151 (e.g., one or more catalogs 250) for the same object, or a similar object, available for purchase via the online retail system 151. For example, the asset registry service 215 may use text (e.g., describing the product identified in the video data 102) as a search input to the online retail system 151, and may compare the identified image of a product in the video data 102 to images of products available for purchase via the online retail system 151. When the asset registry service 215 identifies matching images between the video data 102 and the product images of available products in the online retail system 151, the asset registry service 215 may determine that the products match, and that the matching product in the online retail system 151 may be indicated as a POI for the video data 102. When no matching product exists in the online retail system 151, the asset registry service 215 may identify a similar product, such as a product having a same description (e.g., white shirt, brown shoes, etc.) even if there is no matching image in the online retail system 151 In this manner, the back-end 204 may pre-identify products in the video data 102 and available for purchase via the online retail system 151 prior to presenting the video data 102 to a user and without being provided links, tags, or other indications of the objects shown in the video data 102.

In one or more embodiments, when POIs have been identified based on products in the video data 102 having the same or similar purchasable products in the online retail system 151, the back-end 204 may determine which POIs to present with the video data 102 to a user. For example, a given video frame may show many objects, and it may be undesirable to a user to have a video frame dominated by presentations of objects for purchase. The ranking service 226 may rank video titles and a given video frame's POIs and select a top X number of POIs (e.g., limit the POIs of a video frame to a threshold number of POIs). The ranking may be personalized to a given user (e.g., based on purchase history, user demographics, and the like, in accordance with relevant laws and with user consent). The computer system may send to the video application 206 the video data 102 for presentation along with the POI 105 data and metadata, allowing the video application 206 to present the video frames and the respective POI indications that indicate to viewers which objects in a video frame are available for purchase when selected by the user.

In one or more embodiments, when a user selects a POI presented with the video data 102 (e.g., via a touch, click, voice input, etc.), the back-end 204 may determine which POI was selected (e.g., based on a time/corresponding video frame and location of the selection within the video frame). When the back-end 204 identifies which POI was selected, the back-end 204 may determine which object available for purchase via the online retail system 151 corresponds to the POI, and may invoke the notification service 240 to generate and send a message to the user (e.g., to a registered device of the user) that may include details for the product and a link to a product page in the online shopping system where the user may purchase the product. The notification service 240 may receive notification requests for the POI product information, the requests including a user identifier for a viewer of the application, a channel type, and a POI identifier. The notification service 240 may trigger a serverless computing function to process and respond to the requests. The serverless computing function may read the POI assets in the asset registry service 215 to identify the requested POI asset details, allowing the serverless computing function to generate a message body with the POI asset details. The serverless computing function may invoke a notification platform to send the notification to the device 132 associated with the user identifier.

In one or more embodiments, when a user event related to a POI occurs at the video application 206 (e.g., a viewing or selection of a displayed POI for more information), the back-end 204 may store the user event. Stored user events related to POI views and selections may be used by the metrics pipeline 230 to generate metrics (e.g., engagement metrics). Whether or not a user selected a presented POI, as indicated by the metrics, may be considered when selecting which POIs for a video frame to present to a viewer.

In one or more embodiments, in response to a request for recommended videos (e.g., an application programming interface call requesting recommended videos), the back-end 204 may return recommended videos for a user, along with the POIs for the recommended videos. The POIs may be returned in a same application programming interface (API) response as or a different API response than the API response that returns the recommended videos. When the POIs are identified, they may be stored in the asset registry service 215. In this manner, when the recommended videos are returned in response to an API call for recommended videos for a user, the back-end 204 may retrieve the POI assets and their information from the asset registry service 215 to return to the requesting application. The object detection service 160 that performs POI detection in the video data 102 may open an endpoint to allowing incoming calls from the asset registry service 215. For example, the asset registry service 215 may request a video uniform resource locator (URL), and the endpoint of the object detection service 160 may return the POIs detected for the video corresponding to the video URL. Summaries of the POIs may be published to the ranking service 226 that performs the video/POI rankings, and the POI summaries may be included in response to received requests to get recommended videos (e.g., an API call).

In one or more embodiments, the machine learning model used for object detection service 160 may support shopping-related detection, such as products and styles. The machine learning model may output a summary of the detected objects in videos, such as identified actors, their styles, products, and the like. The machine learning model may output the coordinates (e.g., video frame coordinates) of the detected POIs, allowing for subsequent detection of which POIs are selected by a user based on where a user selection of a POI occurs within a video frame. The same POI may occur in multiple frames at different locations, so the machine learning model may need to recognize such POIs as a single POI having multiple locations and times within a video. The machine learning model may be able to limit the number of POIs presented in a given video frame and in a video clip.

In one or more embodiments, the ranking service 226 may use the RL model 227 to generate recommended video content and POIs. The RL model 227 may generate the recommendations based on repeated simulations in which the RL model 227 receives feedback regarding its recommendations (e.g., the metrics indicating whether a user watched recommended video content and/or selected presented POIs), and may adjust recommendations for the rankings accordingly until a loss function is optimized. For example, if the metrics indicate that a user watched a recommended video and/or selected a recommended POI, the ranking for the video or POI may be increased.

Figure 3:
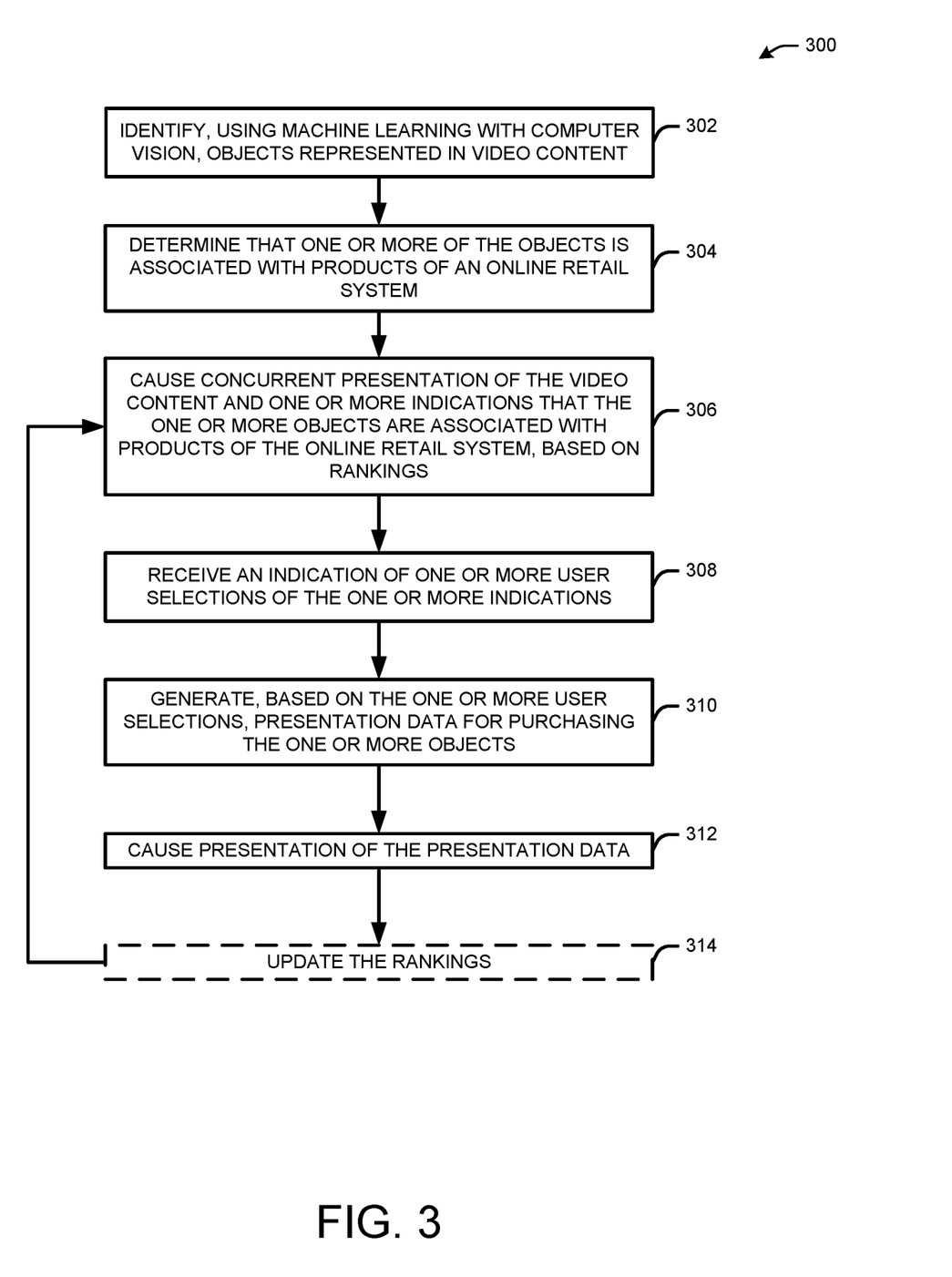
FIG. 3 illustrates a flow diagram for a process for shopping based on recognition of objects presented in video, in accordance with one or more example embodiments of the present disclosure.

FIG. 3 illustrates a flow diagram for a process 300 for shopping based on recognition of objects presented in video, in accordance with one or more example embodiments of the present disclosure.

At block 302, a device (or system, e.g., the remote device 150 of FIG. 1, the back-end 204 of FIG. 2) may identify, using machine learning with computer vision (e.g., the object detection service 160 of FIG. 1), objects represented in video content (e.g., frames of the video data 102 of FIG. 1). The computer vision techniques may identify objects represented by the video data of a video frame.

At block 304, the device may determine that one or more of the objects is associated with products of an online retail system (e.g., the online retail system 151 of FIG. 1). The online retail system may be unassociated with the video application 206 of FIG. 2, for example, and therefore may use a different system that the back-end 204 of FIG. 2 (e.g., unassociated with playback of the video data 102). The computer vision techniques may identify objects represented by the video data of a video frame. The device may search an online shopping system for the same object, or a similar object, available for purchase via the online shopping system. For example, the computer system may use text (e.g., describing the product identified in the video data) as a search input to the online shopping system, and may compare the identified image of a product in the video data to images of products available for purchase via the online shopping system. In this manner, the identification of POIs corresponding to purchasable products may use a multi-modal search (e.g., text and image data). When the device identifies matching images between the video data and the product images of available products in the online shopping system, and/or when the text search of objects identified in the video data corresponds to product text in the catalog, the device may determine that the products match, and that the matching product in the online shopping system may be indicated as a POI for the video data.

At block 306, the device may cause concurrent presentation (e.g., at the device 132 of FIG. 1) of the video content (e.g., the video data 102) and indications of POIs corresponding to products associated with the identified POI objects (e.g., products corresponding to the POI indications 120 and 121 of FIG. 1). The number of POIs presented in a given video frame may be limited by a threshold maximum number of POIs, and the POIs selected for presentation may be based on rankings of video data and the objects corresponding the POIs (e.g., the objects of most interest to a user, based on user preferences, other users' preferences, and the like).

At block 308, the device may receive an indication of one or more user selections (e.g., the user selection 140 of FIG. 1) of the one or more indications. The user selections may include user inputs such as touch, voice gesture, clicks, and the like. The user selections may correspond to a location of the POI presented with the video data in a given video frame. For example, when an object is presented in the center of a video frame, a selected POI having coordinates in the center of the video frame is indicative of a selection of the product corresponding to the POI having coordinates in the center of the video frame. In this manner, the device may discern between user selections of POIs for one video frame versus another video frame (e.g., based on timing/video frame data provided with the user selection), and between multiple POIs presented in a same video frame (e.g., based on location/coordinate data with regard to where the selected POI was presented in a video frame).

At block 310, the device may generate, based on the one or more user selections, presentation data (e.g., the presentation data 152 of FIG. 1) for purchasing the one or more objects corresponding to selected POIs. The presentation data may include user interface data, such as for a product page of the online retail system (e.g., as shown in FIG. 1), and/or may include email or text messages presenting images and/or text descriptions of the object, indicating that the object is a product that may be purchased using the online retail system. At block 312, the device may cause presentation of the presentation data. For example, the device may present the presentation data, or may send the presentation data to another device for presentation (e.g., at the device 132 of FIG. 1).

At block 314, optionally, the device may update the rankings (e.g., based on real-time feedback provided by the metrics pipeline 230 of FIG. 2). The updated rankings may be different than the rankings used to select and present the video data and the POIs for the video data.

Figure 4:
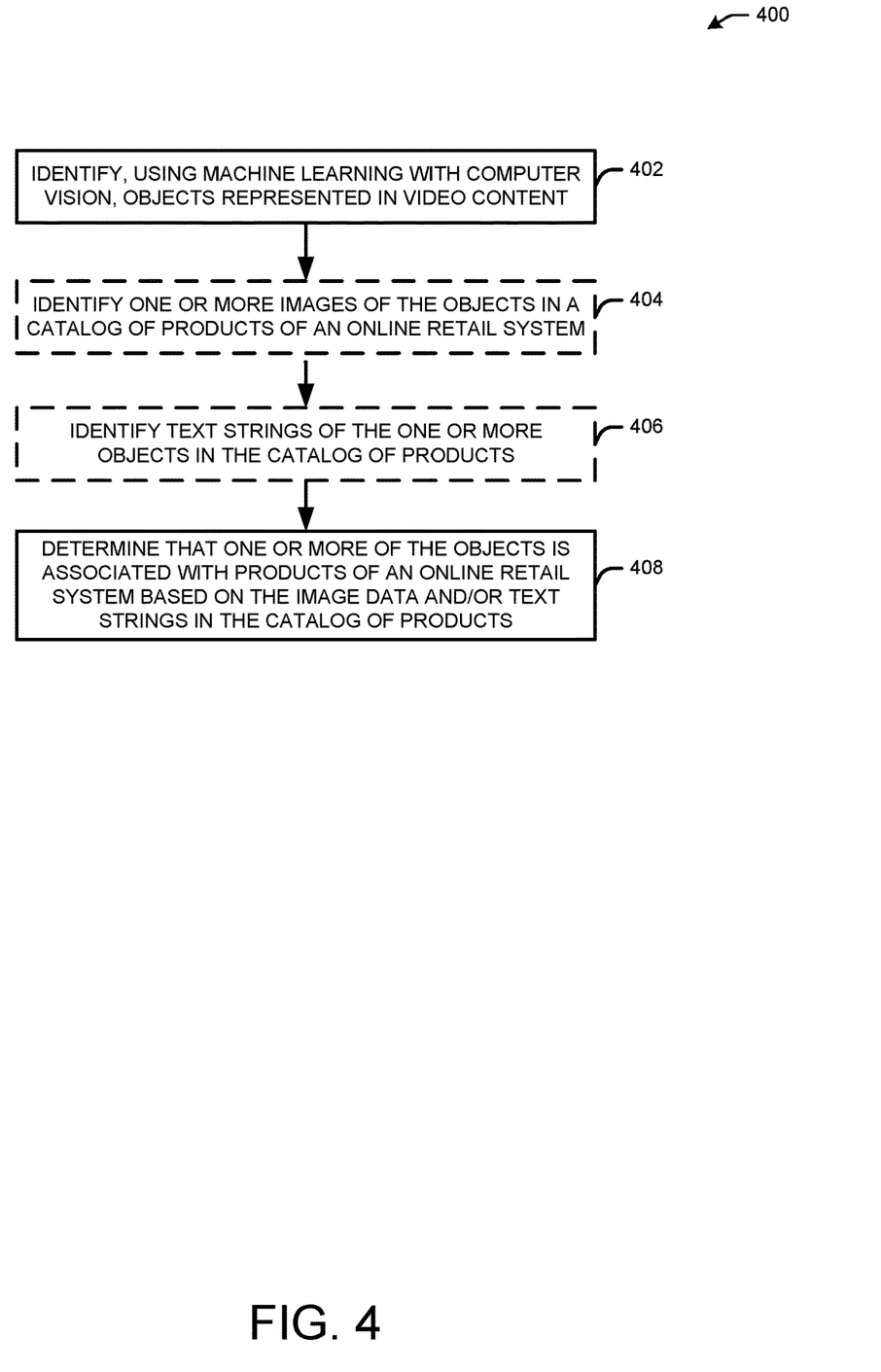
FIG. 4 illustrates a flow diagram for a process for shopping based on recognition of objects presented in video, in accordance with one or more example embodiments of the present disclosure.

FIG. 4 illustrates a flow diagram for a process 400 for shopping based on recognition of objects presented in video, in accordance with one or more example embodiments of the present disclosure.

At block 402, a device (or system, e.g., the remote device 150 of FIG. 1, the back-end 204 of FIG. 2) may identify, using machine learning with computer vision (e.g., the object detection service 160 of FIG. 1), objects represented in video content (e.g., frames of the video data 102 of FIG. 1). The computer vision techniques may identify objects represented by the video data of a video frame.

At block 404, optionally, the device may identify one or more images of the objects in a catalog of products (e.g., the catalog 250 of FIG. 2) of an online retail system (e.g., the online retail system 151 of FIG. 1). The device may search an online shopping system for the same object, or a similar object, available for purchase via the online shopping system. For example, the computer system may compare the identified image of a product in the video data to images of products available for purchase via the online shopping system.

At block 406, optionally, the device may identify text strings of the one or more objects in the catalog of products. The device may use text (e.g., describing the product identified in the video data) as a search input to the online shopping system.

At block 408, the device may determine, based on the image data and/or text data matches with the catalog, that one or more identified objects in the video data is associated with products of the online retail system. When the device identifies matching images between the video data and the product images of available products in the online shopping system, the device may determine that the products match, and that the matching product in the online shopping system may be indicated as a POI for the video data. When the device identifies matching text between the video data and the product text (e.g., product name, type, brand, etc.) of available products in the online shopping system, the device may determine that the products match, and that the matching product in the online shopping system may be indicated as a POI for the video data. In this manner, the identification of POIs corresponding to purchasable products may use a multimodal search (e.g., text and image data).

Figure 5:
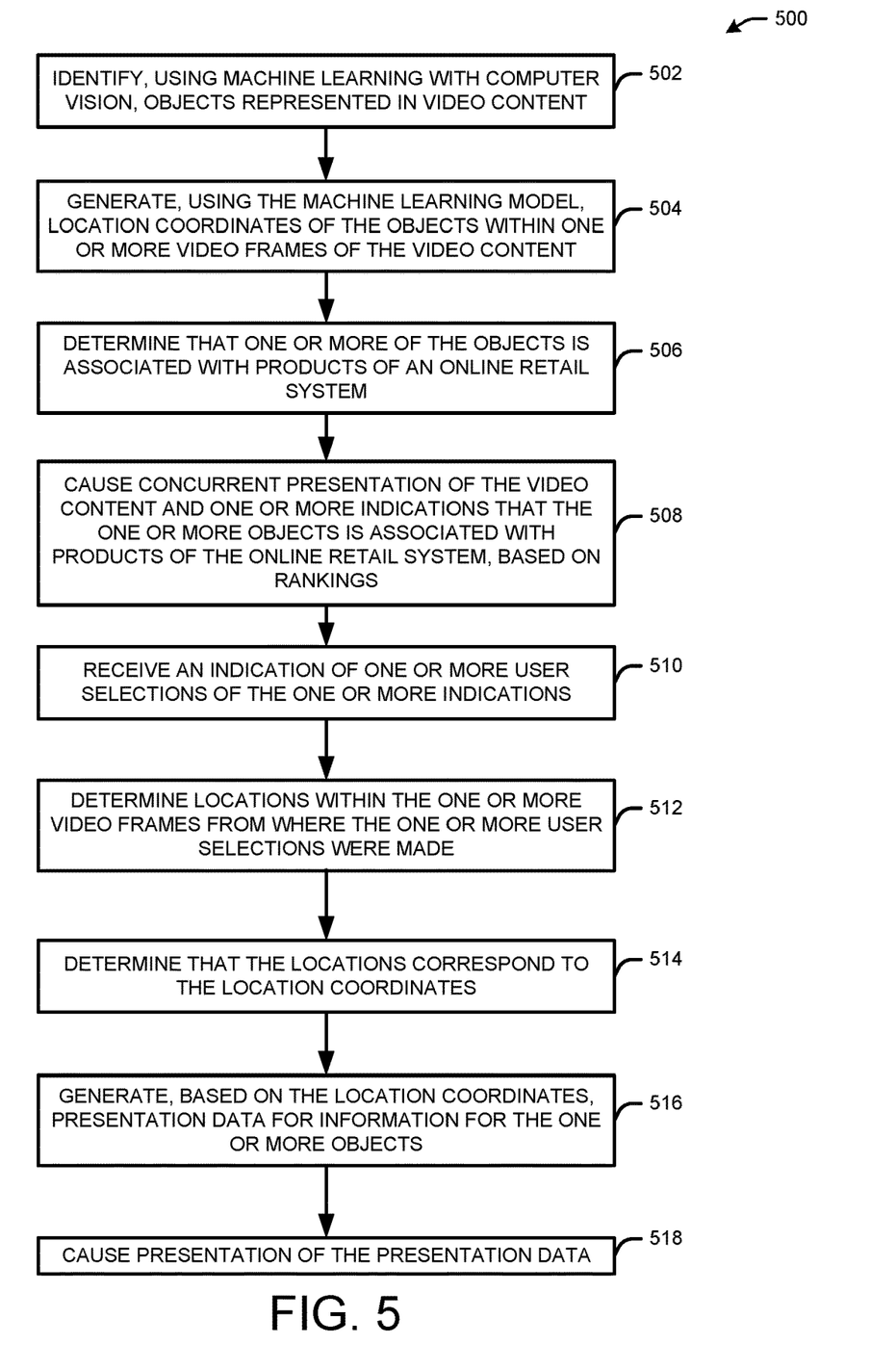
FIG. 5 illustrates a flow diagram for a process for shopping based on recognition of objects presented in video, in accordance with one or more example embodiments of the present disclosure.

FIG. 5 illustrates a flow diagram for a process 500 for shopping based on recognition of objects presented in video, in accordance with one or more example embodiments of the present disclosure.

At block 502, a device (or system, e.g., the remote device 150 of FIG. 1, the back-end 204 of FIG. 2) may identify, using machine learning with computer vision (e.g., the object detection service 160 of FIG. 1), objects represented in video content (e.g., frames of the video data 102 of FIG. 1). The computer vision techniques may identify objects represented by the video data of a video frame.

At block 504, the device may generate, using the machine learning model, location coordinates of the objects within respective video frames of the video content. The machine learning model may output the coordinates (e.g., video frame coordinates) of the detected POIs, allowing for subsequent detection of which POIs are selected by a user based on where a user selection of a POI occurs within a video frame. For example, when an object is presented in the center of a video frame, a selected POI having coordinates in the center of the video frame is indicative of a selection of the product corresponding to the POI having coordinates in the center of the video frame. When an object is in the upper right of a video frame, the coordinates of the video frame may indicate that location. In this manner, the machine learning model may identify the POIs and their corresponding locations within video frames, allowing for determining which POIs are selected based on a location of a user selection of a POI within a video frame.

At block 506, the device may determine that one or more of the detected objects is associated with products of an online retail system (e.g., the online retail system 151 of FIG. 1). The device may identify text strings of the one or more objects in the catalog of products. The device may use text (e.g., describing the product identified in the video data) as a search input to the online shopping system. The device may determine, based on the image data and/or text data matches with the catalog, that one or more identified objects in the video data is available for purchase using the online retail system. When the device identifies matching images between the video data and the product images of available products in the online shopping system, the device may determine that the products match, and that the matching product in the online shopping system may be indicated as a POI for the video data. When the device identifies matching text between the video data and the product text (e.g., product name, type, brand, etc.) of available products in the online shopping system, the device may determine that the products match, and that the matching product in the online shopping system may be indicated as a POI for the video data. In this manner, the identification of POIs corresponding to purchasable products may use a multimodal search (e.g., text and image data).

At block 508, the device may cause concurrent presentation (e.g., at the device 132 of FIG. 1) of the video content (e.g., the video data 102) and indications of POIs corresponding to products of the online retail system (e.g., the POI indications 120 and 121 of FIG. 1). The number of POIs presented in a given video frame may be limited by a threshold maximum number of POIs, and the POIs selected for presentation may be based on rankings of video data and the objects corresponding the POIs (e.g., the objects of most interest to a user, based on user preferences, other users' preferences, and the like).

At block 510, the device may receive an indication of one or more user selections (e.g., the user selection 140 of FIG. 1) of the one or more indications. The user selections may include user inputs such as touch, voice gesture, clicks, and the like. The user selections may correspond to a location of the POI presented with the video data in a given video frame. For example, when an object is presented in the center of a video frame, a selected POI having coordinates in the center of the video frame is indicative of a selection of the product corresponding to the POI having coordinates in the center of the video frame. In this manner, the device may discern between user selections of POIs for one video frame versus another video frame (e.g., based on timing/video frame data provided with the user selection), and between multiple POIs presented in a same video frame (e.g., based on location/coordinate data with regard to where the selected POI was presented in a video frame).

At block 512, the device may determine locations within the one or more video frames from where the one or more user selections were made. The user selections may correspond to a location of the POI presented with the video data in a given video frame. For example, when an object is presented in the center of a video frame, a selected POI having coordinates in the center of the video frame is indicative of a selection of the product corresponding to the POI having coordinates in the center of the video frame.

At block 514, the device may determine that the locations correspond to coordinates. In this manner, the device may discern between user selections of POIs for one video frame versus another video frame (e.g., based on timing/video frame data provided with the user selection), and between multiple POIs presented in a same video frame (e.g., based on location/coordinate data with regard to where the selected POI was presented in a video frame).

At block 516, the device may generate, based on the one or more user selections and their location coordinates, presentation data (e.g., the presentation data 152 of FIG. 1) for information for the one or more objects corresponding to selected POIs. The presentation data may include user interface data, such as for a product page of the online retail system (e.g., as shown in FIG. 1), and/or may include email or text messages presenting images and/or text descriptions of the object, indicating that the object is a product that may be purchased using the online retail system. At block 312, the device may cause presentation of the presentation data. For example, the device may present the presentation data, or may send the presentation data to another device for presentation (e.g., at the device 132 of FIG. 1).

At block 518, the device may cause presentation of the presentation data. For example, the device may present the presentation data, or may send the presentation data to another device for presentation (e.g., at the device 132 of FIG. 1).

The descriptions herein are not meant to be limiting.

Figure 6:
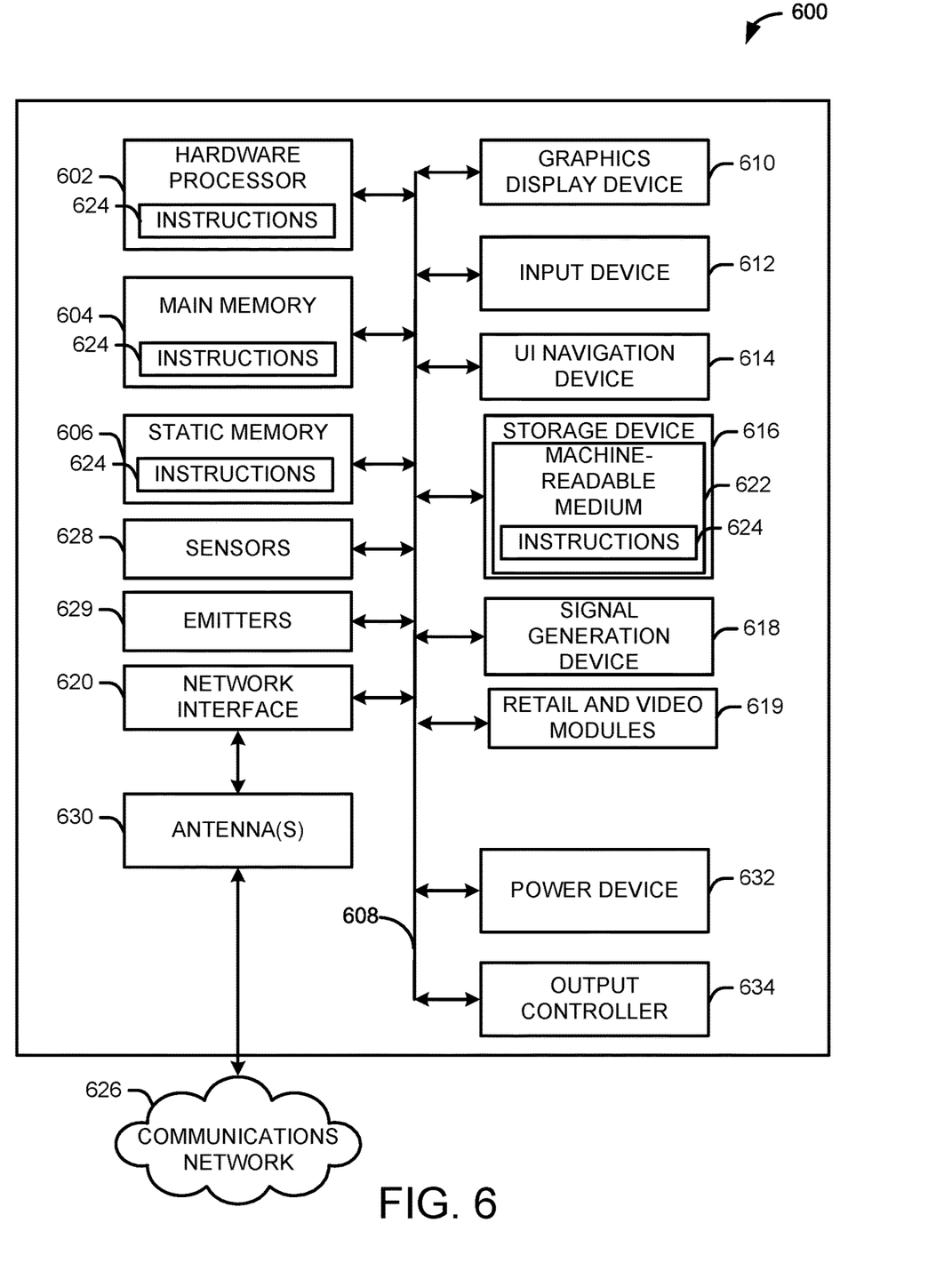
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 104 of FIG. 1, the device 132 of FIG. 1, the remote device 150 of FIG. 1, the online retail system 151 of FIG. 1, the front-end 202 of FIG. 2, the back-end 204 of FIG. 4) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more retail and video modules 619 (e.g., similar to the front-end 202 and/or the back-end 204 of FIG. 2), a network interface device/transceiver 620 coupled to antenna(s) 630, one or more sensors 628, such as a microphone, a global positioning system (GPS) sensor, a compass, an accelerometer, or other sensor, and one or more emitters 629. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might." or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for facilitating shopping for items presented in video content, the method comprising:
    identifying, by at least one processor of a first device, using a machine learning model using a computer vision technique to classify objects represented in video content based on comparisons of the video content to object images, the objects represented in the video content;
    determining, by the at least one processor, based on a comparison of first image data from the video content to a first object image in an online retail system, that a first object of the objects is available for purchase using the online retail system;
    determining, by the at least one processor, based on a comparison of second image data from the video content to a second object image in the online retail system, that a second object of the objects is available for purchase using the online retail system;
    causing, by the at least one processor, concurrent presentation, at a second device, of the video content and a first indication that the first object is available for purchase using the online retail system;
    receiving, by the at least one processor, from the second device, a second indication of a user selection of the first indication, wherein the user selection is indicative of a request to present, at a third device, additional information associated with the first object;
    generating, by the at least one processor, based on the request, presentation data comprising the additional information and an option to purchase the first object using the online retail system; and
    causing, by the at least one processor, based on the request, presentation of the presentation data at the third device.

2. The method of claim 1, further comprising:
    determining, based on the user selection, a video frame of the video content from which the user selection was made;
    determining, a location within the video frame from where the user selection was made; and
    determining that the location is indicative of the first object,
    wherein generating the presentation data is based on determining that the location is indicative of the first object.

3. The method of claim 1, further comprising:
    generating a metric indicative of the user selection, the video content, and the first object;
    generating a ranking of video titles base on the metric; and
    causing presentation, at the second device, of second video content based on the ranking.

4. The method of claim 1, further comprising:
    identifying, in a catalog of products available for purchase using the online retail system, the first object image,
    wherein determining that the first object of the objects is available for purchase using the online retail system is based on the first object image in the catalog compared to the first image data.

5. The method of claim 1, further comprising:
    providing, to the online retail system a search query comprising a text string indicative of the first object; and
    identifying search results of the search query; and
    identifying the first object image in the search results.

6. The method of claim 1, wherein the concurrent presentation further comprises a second indication that the second object is available for purchase using the online retail system.

7. A method for facilitating shopping for items presented in video content, the method comprising:
    identifying, by at least one processor of a first device, using a machine learning model using a computer vision technique, objects represented in video content;
    determining, by the at least one processor, based on a comparison of first image data from the video content to a first object image in an online retail system, that an object of the objects is associated with a product of the online retail system;

causing, by the at least one processor, concurrent presentation, at a second device, of the video content and a first indication that the object is associated with the product of the online retail system;

receiving, by the at least one processor, from the second device, a second indication of a user selection of the first indication, wherein the user selection is indicative of a request to present additional information associated with the product;

generating, by the at least one processor, based on the request, presentation data comprising the additional information and an option to purchase the product using the online retail system; and causing, by the at least one processor, based on the request, presentation of the presentation data.

8. The method of claim 7, further comprising:

generating, using the machine learning model, location coordinates of the object within a video frame of the video content.

9. The method of claim 8, further comprising:

determining, a location within the video frame from where the user selection was made; and determining that the location comprises the location coordinates, wherein generating the presentation data is based on determining that the location comprises the location coordinates.

10. The method of claim 7, further comprising:

selecting the video content from among multiple video titles based on a first ranking of video titles;

generating a metric indicative of the user selection, the video content, and the object;

generating, using a reinforced learning model, a second ranking of video titles based on the metric as feedback to the reinforced learning model; and causing presentation of second video content based on the second ranking.

11. The method of claim 7, further comprising:

providing, to the online retail system a search query comprising a text string indicative of the object; and identifying search results of the search query; and identifying the first object image in the search results.

12. The method of claim 7, further comprising:

determining, by the at least one processor, that a second object of the objects is associated with a second product of the online retail system, wherein the concurrent presentation further comprises a second indication that the second object is associated with a second product of the online retail system.

13. The method of claim 7, further comprising:

determining a maximum number of objects permitted to be concurrently presented with the video content, wherein generating the presentation data is based on the maximum number.

14. The method of claim 7, wherein the first device is associated with a back-end of a video application, wherein the second device is associated with a front-end of the video application, and wherein the concurrent presentation occurs at the second device.

15. The method of claim 7, wherein the presentation data are presented using a product page for the object.

16. The method of claim 7, wherein the presentation data are presented using a message with a uniform resource locator associated with a product page for the object.

17. A system for facilitating shopping for items presented in video content, the system comprising memory coupled to at least one processor, the at least one processor configured to:

identify, using a machine learning model using a computer vision technique, objects represented in video content;

determine, based on a comparison of first image data from the video content to a first object image in an online retail system, that an object of the objects is associated with a product of the online retail system;

cause concurrent presentation, at a first device, of the video content and a first indication that the object is associated with the product of the online retail system;

receive, from the first device, a second indication of a user selection of the first indication, wherein the user selection is indicative of a request to present additional information associated with the product;

generate, based on the request, presentation data comprising the additional information and an option to purchase the product using the online retail system; and cause, based on the request, presentation of the presentation data.

18. The system of claim 17, wherein the at least one processor is further configured to:

generate, using the machine learning model, location coordinates of the object within a video frame of the video content.

19. The system of claim 18, wherein the at least one processor is further configured to:

determine a location within the video frame from where the user selection was made; and determine that the location comprises the location coordinates, wherein to generate the presentation data is based on determining that the location comprises the location coordinates.

20. The system of claim 17, wherein the at least one processor is further configured to:

provide, to the online retail system a search query comprising a text string indicative of the object; and identify search results of the search query; and identify the first object image in the search results.

* * * * *